(12) United States Patent
Riehl et al.

(10) Patent No.: US 11,859,683 B2
(45) Date of Patent: Jan. 2, 2024

(54) COMPONENT OF A BRAKE FOR A VEHICLE AND METHOD FOR ITS MANUFACTURING

(71) Applicant: Fritz Winter Eisengiesserei GmbH & Co. KG, Stadtallendorf (DE)

(72) Inventors: Sven Riehl, Germünden (DE); Tobias Müller, Stadtallendorf (DE); Axel Weiser, Dillenburg (DE)

(73) Assignee: Fritz Winter Eisengiesserei GmbH & Co. KG, Stadtallendorf (DE)

( * ) Notice: Subject to any disclaimer, the term of this patent is extended or adjusted under 35 U.S.C. 154(b) by 0 days.

(21) Appl. No.: 17/923,491

(22) PCT Filed: May 5, 2021

(86) PCT No.: PCT/EP2021/061809
§ 371 (c)(1),
(2) Date: Nov. 4, 2022

(87) PCT Pub. No.: WO2021/224308
PCT Pub. Date: Nov. 11, 2021

(65) Prior Publication Data
US 2023/0193967 A1    Jun. 22, 2023

(30) Foreign Application Priority Data
May 5, 2020   (DE) .................. 10 2020 112 100.8

(51) Int. Cl.
*F16D 65/12*     (2006.01)
*B33Y 10/00*     (2015.01)
(Continued)

(52) U.S. Cl.
CPC ............ *F16D 65/127* (2013.01); *B22F 10/28* (2021.01); *B23K 26/342* (2015.10); *B33Y 10/00* (2014.12);
(Continued)

(58) Field of Classification Search
CPC .......... C23C 28/027; F16D 65/123–128; F16D 2065/132; F16D 2200/0021;
(Continued)

(56) References Cited

U.S. PATENT DOCUMENTS 5,223,332 A * 6/1993 Quets ..................... C23C 28/04
428/665
5,261,477 A    11/1993 Brunet et al.
(Continued)

FOREIGN PATENT DOCUMENTS

DE    102005008569 A1    10/2006
DE    102006035948 A1    2/2008
(Continued)

OTHER PUBLICATIONS

Schopphoven et al., "Laserbeschichtung von Bremsscheiben mit angepasster Fertigbearbeitung (Laser Coating of Brake Discs with Adapted Finishing)", Laserbeschichtung, VDI-Z BD, 2019, pp. 48-51, No. 7/8—English-language Translation.
(Continued)

*Primary Examiner* — Christopher P Schwartz
(74) *Attorney, Agent, or Firm* — The Webb Law Firm

(57) ABSTRACT

A component of a brake for a vehicle, having a metallic base body with a surface provided with a coating which includes an intermediate layer lying on the base body and a covering layer lying on the intermediate layer. The covering layer is formed from a stainless steel matrix with hard material particles embedded therein. The hard material particles embedded in the stainless steel matrix have an average grain diameter of 10-125 μm and have a non-melted core region consisting of uninfluenced material of the hard material particles, which core region is surrounded at least in sections by a mixing zone formed from material of the stainless steel matrix and material of the respective hard material particle,
(Continued)

via which mixing zone the hard material particles are in each case materially bonded to the stainless steel matrix. Also, a method by which a component coated in this way is produced.

16 Claims, 2 Drawing Sheets

(51) Int. Cl.
    *B33Y 80/00*     (2015.01)
    *B23K 26/342*     (2014.01)
    *B33Y 70/10*     (2020.01)
    *B22F 10/28*     (2021.01)
    *B23K 103/04*     (2006.01)
    *F16D 65/02*     (2006.01)

(52) U.S. Cl.
    CPC ............... *B33Y 70/10* (2020.01); *B33Y 80/00* (2014.12); *B23K 2103/05* (2018.08); *F16D 2065/132* (2013.01); *F16D 2200/0021* (2013.01); *F16D 2250/0046* (2013.01)

(58) Field of Classification Search
    CPC . F16D 2250/0046; B33Y 10/00; B33Y 80/00; B33Y 70/10; B23K 26/342; B23K 2103/05; B23K 26/346; B22F 10/28
    USPC .................................. 188/218 XL; 148/284
    See application file for complete search history.

(56) References Cited

U.S. PATENT DOCUMENTS

| | | |
|---|---|---|
| 5,407,035 A | 4/1995 | Cole et al. |
| 10,260,585 B2 | 4/2019 | Saga et al. |
| 2003/0121574 A1 | 7/2003 | Brenner et al. |
| 2007/0286961 A1* | 12/2007 | Pahle ........................ C23C 4/02 |
| | | 188/218 XL |
| 2009/0134133 A1 | 3/2009 | Mokadem |
| 2011/0293849 A1* | 12/2011 | Lembach ............... F16D 65/127 |
| | | 148/284 |
| 2017/0122392 A1* | 5/2017 | Lembach ................ F16D 69/04 |
| 2018/0180125 A1 | 6/2018 | Hollis |
| 2020/0072307 A1* | 3/2020 | Rettig .................... C23C 28/027 |
| 2021/0293292 A1* | 9/2021 | Rettig ................... B23K 26/342 |
| 2023/0136257 A1* | 5/2023 | Utsch ..................... B23K 26/40 |
| | | 219/76.1 |
| 2023/0151859 A1* | 5/2023 | Steinmeier ........... B23K 26/342 |
| | | 188/218 XL |

FOREIGN PATENT DOCUMENTS

| | | | | |
|---|---|---|---|---|
| DE | 102006060775 A1 | | 6/2008 | |
| DE | 102008053637 A1 | | 5/2010 | |
| DE | 102011100456 A1 | | 11/2012 | |
| DE | 102018120897 A1 | | 2/2020 | |
| DE | 102019212844 A1 | | 3/2020 | |
| DE | 102018221578 A1 | * | 6/2020 | ............ F16D 65/12 |
| EP | 3034902 B1 | | 6/2016 | |
| JP | H0211936 A | | 1/1990 | |
| JP | H04258533 A | | 9/1992 | |
| JP | H05192761 A | | 8/1993 | |
| KR | 1020090036078 A | | 4/2009 | |
| KR | 1020150111352 A | | 10/2015 | |
| KR | 1020160032273 A | | 3/2016 | |
| WO | 2014120729 A1 | | 8/2014 | |
| WO | 2020043712 A1 | | 3/2020 | |

OTHER PUBLICATIONS

Schopphoven et al. "Laserbeschichtung von Bremsscheiben mit angepasster Fertigbearbeitung" ["Laser Coating of Brake Discs with Adapted Processing"], Laserbearbeitung, 2019, vol. 161, No. 7/8, pp. 48-51 [English-language Translation].

* cited by examiner

COMPONENT OF A BRAKE FOR A VEHICLE AND METHOD FOR ITS MANUFACTURING

CROSS-REFERENCE TO RELATED APPLICATIONS

This application is the United States national phase of International Application No. PCT/EP2021/061809 filed May 5, 2021, and claims priority to German Patent Application No. 10 2020 112 100.8 filed May 5, 2020, the disclosures of which are hereby incorporated by reference in their entirety.

BACKGROUND OF THE INVENTION

Field of the Invention

The invention relates to a component of a brake for a vehicle, having a metallic base body which has a surface which, in order to increase its wear resistance, is provided with a coating which comprises an intermediate layer lying on the base body and a covering layer lying on the intermediate layer, which covering layer is formed from a stainless steel matrix with hard material particles embedded therein.

Description of Related Art

Similarly, the invention relates to a method for manufacturing a component for a brake for a vehicle, in which an intermediate layer is produced on a surface of a base body of the component and in which, subsequently, by a further laser deposition welding method, in which a laser beam is moved over a stainless steel powder applied to the free surface of the intermediate layer, a covering layer is produced on the intermediate layer, which covering layer is formed from a stainless steel matrix with hard material particles embedded therein.

A component of this type designed as an internally ventilated brake disk is known from DE 10 2008 053 637 B4. In this brake disk, the friction surface formed on the friction ring of the brake disk and loaded by a brake lining pressed against it during a braking process is covered with a two-layer coating, in which an intermediate layer is applied directly to the friction surface of the base body of the brake disk and serves to bond the outer covering layer of the coating lying thereon and to thermally dissipate the thermal energy introduced into the outer layer during a braking process. The intermediate layer consists of a zinc- and/or nickel-based alloy, whereas the covering layer is a carbide layer or a metal matrix composite layer. The thickness of the coating is matched with the geometric relationships of the internally ventilated disk in that the thickness of the coating above the cooling channel of the brake disk is greater than above the nubs or webs delimiting the cooling channels from one another.

DE 10 2005 008 569 A1 also describes a brake disk on whose friction surface a coating consisting of two layers has also been applied. The layers are produced from coating powders. The coating powders are composed in such a way that they form a nickel- or nickel-cobalt-based matrix in which hard material particles, such as WC or $TiO_2$, are incorporated in order to adjust the required hardness. The respective coating powder is applied to the surfaces of the brake disk to be coated by high-speed flame spraying, wherein first a thin intermediate layer and subsequently a thicker covering layer are sprayed on. Subsequently, a heat treatment is carried out, in which the layers previously sprayed on are melted to effect their material bond to the base body of the brake disk consisting of gray cast iron material. Thereby, the toughness and hardness of the layers are matched with one another in such a way that the bonding of the covering layer is ensured by the intermediate layer.

Furthermore, it is known from U.S. Pat. No. 5,407,035 A to form a coating on a friction surface of a brake disk in at least two layers in such a way that, via an intermediate layer lying on the base body of the brake disk, a bonding of the covering layer lying thereon is achieved, wherein the thickness of the intermediate layer is considerably smaller than the thickness of the covering layer.

A component and a method of the type indicated at the beginning are known from WO 2020/043712 A1. Thereby, the component known from this publication comprises a metallic base body which has a surface which, in order to increase its wear resistance, is provided with a coating which comprises an intermediate layer lying on the base body and a covering layer lying on the intermediate layer, wherein the intermediate layer has a higher toughness than the covering layer, which in turn has a higher hardness than the intermediate layer. To simplify the manufacture of such a component and increase its wear resistance, the intermediate layer consists of a Ni or Cr alloy with a Ni or Cr content of more than 50% by weight in each case and, optionally, hard material particles incorporated into the intermediate layer to improve the wear resistance. In contrast, the covering layer is formed from a stainless steel matrix with hard material particles embedded therein, wherein the thermal conductivity of the base body is 1.5 to 3 times greater than the thermal conductivity of the intermediate layer, the thermal conductivity of the covering layer is 2 to 4.5 times greater than the thermal conductivity of the base body and wherein for the thickness ratio $Vd=Dd/Dz$ formed from the thickness $Dz$ of the intermediate layer and the thickness $Dd$ of the covering layer applies $Vd \geq 1.5$.

For the application of the covering layer, WO 2020/043712 A1 provides for a high-speed laser deposition welding method as described in DE 10 2011 100 456 B4. In this method, a molten bath with at least one molten filler material is produced on a surface to be coated by means of a laser beam irradiating onto the molten bath, in that powder of the filler material is melted by means of the laser beam, wherein the filler material is melted by the laser beam at a distance from the molten bath and is fed to the molten bath in completely molten form. Thereby, the molten bath and a focus of the laser beam are moved parallel to each other relative to the surface to be coated at a speed of at least 20 m/min and the powder density is adjusted so that a laser power of the laser beam in the molten bath is less than 60% of the laser power before contact of the laser beam with the powder. By using such methods, a particularly intensive bonding of the intermediate layer to the base body and the covering layer can be effected, so that the risk of delamination of the covering layer from the intermediate layer or of the coating as a whole from the base body is minimized to a particular extent. Thereby, the decisive advantage of the method known from DE 10 2011 100 456 B4 is seen in that the filler material is fed to the molten bath in the aggregate state that the molten bath has on the surface of the component. This eliminates the time required to melt the powder particles in the molten bath. This in turn should reduce the time required for the layer formation, which should allow the process speed to be considerably increased.

SUMMARY OF THE INVENTION

Against the background of the state of the art, the problem has arisen of creating a brake component of the type mentioned at the beginning and explained in detail above, which has further optimized usage properties compared with the state of the art.

In addition, a method should be specified that enables the operationally secure manufacture of such a component.

The invention has solved this problem by a component that has at least the features as described herein.

The method according to the invention for manufacturing such a component is as described herein.

Advantageous embodiments of the invention are explained in detail below, as is the general idea of the invention.

Accordingly, a component of a brake for a vehicle according to the invention comprises a metallic base body which has a surface which, in order to increase its wear resistance, is provided with a coating which comprises an intermediate layer lying on the base body and a covering layer lying on the intermediate layer, which covering layer is formed from a stainless steel matrix with hard material particles embedded therein.

According to the invention, the hard material particles embedded in the stainless steel matrix of the covering layer have an average grain diameter of 10 μm to 125 μm, wherein the hard material particles have a non-melted core region consisting of uninfluenced material of the hard material particles, which core region is surrounded at least in sections by a mixing zone formed from material of the stainless steel matrix and material of the respective hard material particle, via which mixing zone the hard material particles are in each case materially bonded to the stainless steel matrix.

In a method according to the invention for manufacturing a component for a brake for a vehicle, in a corresponding manner, in a first step, an intermediate layer is produced on a surface of a base body of the component and, in a second step, by a method of laser deposition welding, in which a laser beam is moved over a stainless steel powder applied to the free surface of the intermediate layer, a covering layer is produced on the intermediate layer, which covering layer is formed from a stainless steel matrix with hard material particles embedded therein. Thereby, during the producing of the covering layer, the laser beam is directed at the stainless steel powder applied to the intermediate layer with a laser intensity that is 0.1-2.5 KW/mm². At the same time, the laser beam is adjusted so that the spot, in which the laser beam impinges on the applied stainless steel powder and in which the stainless steel powder is melted to form a melt bath, has a diameter of 2.5-15 mm. Finally, according to the invention, hard material particles whose average grain diameter is 15 μm to 125 μm are added into the melt bath thus formed.

The invention is based on the finding that due to the hard material particles in the stainless steel matrix of the covering layer having a core region which is bonded to the stainless steel matrix via the mixing zone surrounding it, optimum hold of the hard material particles in the stainless steel matrix is ensured. At the same time, the hard material particles present in the stainless steel matrix according to the invention optimally support the hardness of the covering layer, since their original hardness given before the introduction into the covering layer is maintained in their core region. A covering layer, in which hard material particles are anchored in a materially bonded manner according to the invention, therefore makes an optimum contribution to the wear resistance and effectiveness of a brake component coated with a coating system according to the invention.

In a covering layer according to the invention, there is thus an intermediate layer present between the hard material particles and the material of the stainless steel matrix surrounding them, which intermediate layer differs in composition from both the composition of the hard material particles and of the stainless steel matrix. This mixing layer, which consists of intermixed material of the stainless steel matrix and of the hard material particles and typically completely surrounds the core of the hard material particles, is formed when the hard material particles are partially melted in the course of the laser beam treatment carried out to produce the covering layer, so that melted material of the stainless steel matrix and melted material of the respective hard material particle would flow into each other under formation of the mixing layer. By embedding only sufficiently large grains in the stainless steel matrix of the covering layer according to the invention and limiting the laser energy density required for embedding the hard material particles in the stainless steel matrix in the method according to the invention according to the requirement of the invention, the formation of the mixing layer is supported and at the same time complete melting of the hard material particles is reliably avoided.

As a result, the fact that, according to the invention, the hard material particles embedded in the covering layer are not completely melted, but are maintained in their core region leads to maximized stability and, associated therewith, maximized effectiveness of the coating formed according to the invention.

Accordingly, the parameters of the laser deposition welding method used for producing the covering layer are selected in accordance with the invention in such a way that the local heat input via the laser beam into the stainless steel powder applied to the intermediate layer to form the covering layer is sufficient to melt the powder in the region of the laser spot, i.e. the impact region of the laser beam, but at the same time is limited in such a way that the melting of the hard material particles, which are introduced into the melt bath formed in the laser spot, remains restricted to the peripheral region of the hard material particles. In this way, procedurally, an intensive material bond of the hard material particles is manufactured via the mixing zone formed from the melted peripheral region of the hard material particles and the adjacent molten stainless steel matrix, while the core region of the hard material particles remains maintained in the state in which the hard material particles are introduced into the melt bath.

At the same time, the laser intensity and the diameter of the spots, in which the laser impinges on the stainless steel powder, are matched with each other in such a way that the melt forming in it remains molten for as long as possible despite the supply of the hard material particles. As a result, the hard material particles introduced into the melt bath have sufficient time to distribute evenly in the melt bath before solidification the melt.

As a result, a component coated according to the invention is therefore characterized in that the hard material particles are present in the covering layer in a homogeneously uniform distribution. This in turn contributes to the uniformity with which, in a component according to the invention, the high wear resistance is present distributed over the surface covered with the covering layer.

Optimized manufacturing results can be achieved in the method according to the invention if the laser intensity of the laser beam used for producing the covering layer is at most 1.2 KW/mm$^2$.

Thereby, the laser intensities specified in accordance with the invention can be achieved, taking into account the size of the spot, in which the laser falls on the stainless steel powder forming the matrix of the covering layer, specified in accordance with the invention, in that the laser power of the laser beam used for producing of the covering layer is 6-25 KW.

Another correcting variable, via which the laser intensity and thus the local heat input in the region of the spot in which the laser beam falls on the powder forming the stainless steel matrix, is the diameter of the spot. According to the invention, this is 2.5-15 mm, wherein diameters of at least 8 mm have proved to be particularly suitable during practical testing and optimized processing results could be achieved with spot diameters of at most 12.5 mm.

The thickness of the covering layer applied according to the invention is, after grinding, typically from 50-200 μm, in particular 50-150 μm, wherein thicknesses of the covering layer of 80-140 μm have proved to be particularly favorable in practical tests. In the unsanded state, on the other hand, the thickness of the covering layer is typically 50-300 μm.

The application of the intermediate layer provided according to the invention to the respective surface of the component to be coated can in principle be carried out with any thermal application method, such as deposition welding, spray welding or plasma welding. The techniques required for this are basically known from the prior art. For example, the high-speed laser deposition welding method mentioned already above and specified in DE 10 2011 100 456 B4 is suitable for this purpose.

The intermediate layer can consist of a steel already used for this purpose in the prior art, in particular a stainless steel material known per se, which has sufficient toughness. An example of such a stainless steel material is the steel 316L standardized according to the US standards AISI/ASTM.

The intermediate layer provided in the coating according to the invention fulfills several functions. On the one hand, it serves to compensate for unevenness and recesses, such as pores or blowouts, which are present at the surface of the respective component covered with the coating. On the other hand, the intermediate layer absorbs temperature-related stresses and compensates for them.

To meet these requirements, the intermediate layer can have a thickness of 50-200 μm, in particular 50-150 μm, wherein intermediate layer thicknesses of 80-140 μm have proved particularly favorable in practical tests.

According to the invention, the matrix of the covering layer is formed by a stainless steel. These stainless steels include in particular the stainless, austenitic steels. Suitable for this are, for example, stainless steels which are standardized under the material number 1.4404 or according to the US standards AISI/ASTM in the number series 316-431L. Thereby, steels with reduced or non-effective Ni contents are particularly preferred.

The hard material particles embedded in the matrix of the covering layer ensure the required hardness and, associated therewith, the wear resistance of the covering layer. Suitable hard material particles for this are in particular metal-like, covalent or ionic carbides. The hard materials present in the covering layer according to the invention and optionally in the intermediate layer include in particular tungsten carbides, chromium carbides, titanium carbides, vanadium carbides or silicon carbides. A ratio of matrix material to hard material particles that is optimal with regard to the usage properties of the covering layer is obtained when the volume fraction of the hard material particles embedded in the steel matrix of the covering layer is 20-70% by volume of the total volume of the covering layer. Even higher hard material contents would worsen the strength and heat transfer values of the covering layer. At lower hard material contents, the required hardness would not be achieved.

The hard material particles embedded in the stainless steel matrix of the covering layer according to the invention develop their effect when they are introduced into the covering layer with an average grain size of 15-135 μm. In the state embedded in the covering layer, the unchanged, non-melted core regions of the hard material particles still have a diameter of 15-125 μm. Thereby, it has proved particularly valuable in practical tests if the hard material particles introduced into the stainless steel matrix of the covering layer have an average grain diameter of at most 105 μm. According to the invention, thus, hard material particles with a broad grain size spectrum can be processed. This makes a particular cost-efficient production of the covering layer according to the invention possible. For more demanding requirements, the grain sizes of the hard material particles can be selected more strongly. For example, it can be expedient to incorporate hard material particles with an average grain diameter of at least 20 μm, in particular at least 35 μm or at least 45 μm, into the covering layer. Accordingly, the average grain diameters of the hard material particles introduced into the covering layer according to the invention are preferably 20-105 μm, in particular 35-105 μm or 45-105 μm or 20-60 μm, wherein particularly good results are to be expected with hard material particles with an average grain size of 35-60 μm, in particular 45-60 μm. Thereby, hard material particle fractions of 20-60 μm, in particular 35-60 μm or 45-60 μm, are particularly suitable here for applications in which the laser spot has a smaller diameter of up to 8 mm, while grainings of 35-105 μm, in particular 45-105 μm, are suitable for processing with a spot diameter 8 mm.

The hardness of the covering layer of a coating according to the invention, determined according to DIN EN ISO 6507-1, is 700 HV10 to 1250 HV10 due to the embedding of the hard material particles according to the invention. Typically, the covering layer of a coating according to the invention has a hardness of 850-1050 HV10.

Thereby, a component according to the invention is characterized, due to the homogeneous distribution of the hard material particles embedded in the covering layer achieved by the invention, in that the difference between the smallest value Hmin of the surface hardness determined at the free surface of the covering layer and the largest value Hmax of the surface hardness determined at the free surface of the covering layer is at most 250 HV10, in particular 100 HV10 (i.e. [Hmax−Hmin]≤100 HV10).

The invention shows a particular good effect in the case that the component coated in accordance with the invention is a friction ring of a brake disk and the surface covered with the coating is a friction surface present on the friction ring, against which friction surface an actuating device with a brake lining acts during a braking process. Thereby, the friction ring can be a separately manufactured component of the brake disk which is connected to the respective supporting part of the brake disk in a special assembly step, as is the case with so-called "assembled brake disks" or with brake disks in which the supporting part is cast onto the friction ring in a separate work step or the friction ring is cast onto the supporting part in a separate work step. Likewise, the friction ring can of course be part of a brake disk manufactured in one piece, in particular by casting, in which supporting part and friction ring are connected in one piece with each other.

If it turns out that the roughness or unevenness at the free surface of the covering layer of a coating applied according to the invention is too great, the surface in question can be given sufficient flatness and roughness by grinding. In the case that the surface coated according to the invention is the friction surface of a brake disk, thereby, the target value is an average roughness Ra of 1-3.2 μm, in particular 1.4-1.7 μm, determined in accordance with DIN EN ISO 4288, and a flatness deviation of at most 20 μm.

The material, of which the base body of the component according to the invention consists, is typically a metallic cast material which enables the base body to be manufactured by casting. This includes in particular iron or aluminum cast materials whose thermal conductivity corresponds particularly well to the requirements of the invention and which are particularly suitable for the manufacture of friction rings.

In order to maintain the molten bath formed in the laser spot from the stainless steel powder of the stainless steel matrix for as long as possible, it can be expedient to preheat the component to a preheating temperature of 100-700° C. prior to impingement of the laser beam. In this way, the heat dissipation from the melt bath into the base body of the component can be delayed, so that the solidification of the matrix material of the covering layer also proceeds more slowly.

For the preheating, the component can be heated as a whole in a suitable oven. In the case of larger components or components in which only certain surface sections are to be coated, the preheating can also be limited to the surface sections to be coated. Thereby, surface sections adjacent to each other can be heated successively one after the other and in a manner leading the coating. For this purpose, induction heating is particularly suitable. It is particularly practical here if locally restricted induction heating is carried out in a manner leading the laser spot, i.e. if the component is heated successively, in a manner leading the laser beam in each case in a locally restricted manner in the section in which the stainless steel powder is subsequently melted by the laser beam.

Preheating temperatures of 250-350° C. have proved particularly suitable for the purposes of the invention. The preheating also contributes to the reduction of stresses also between the covering layer and the intermediate layer as well as between the intermediate layer and the base body.

BRIEF DESCRIPTION OF THE DRAWINGS

The invention is explained in more detail below with reference to an embodiment/to embodiments.

DESCRIPTION OF THE INVENTION

Figure 1:
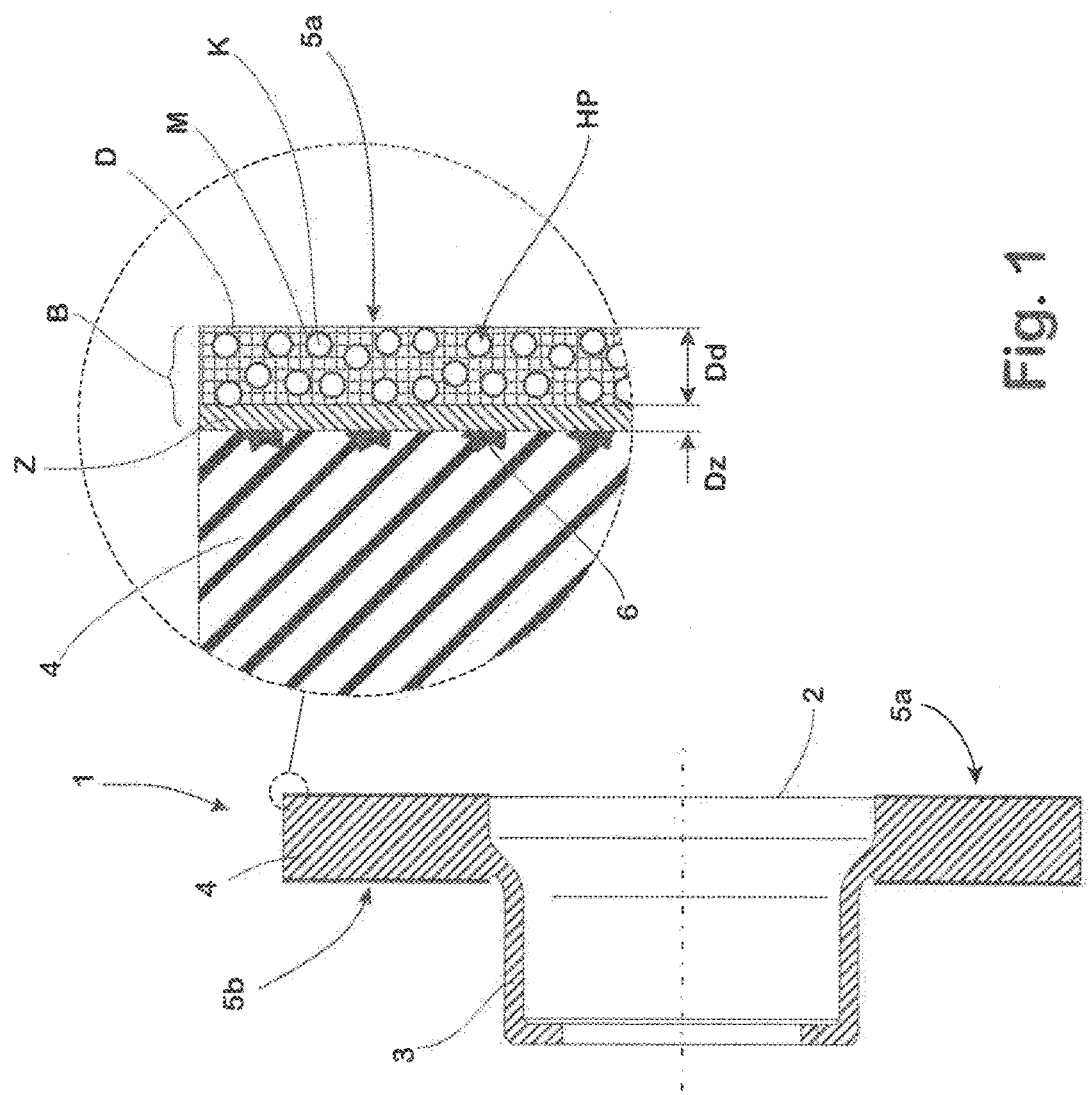
FIG. 1 shows a brake disk for a motor vehicle in a section along its rotational axis X-X.

The brake disk 1, which constitutes a component within the meaning of the invention, has a base body 2 which is designed in a conventional manner and is cast from a cast iron material known for this purpose with the DIN-EN designation EN-JL1040.

The brake disk 1 has a pot-shaped supporting part 3 and a friction ring 4 cast thereon, which is shown here as consisting of solid material, but can also be designed in conventional manner as an internally ventilated friction ring 4.

The friction ring 4 has, in an equally usual manner, an annular friction surface 5a,5b on each of its front surfaces aligned normal to the rotational axis X-X.

In the case of the base body 2 provided for the coating, friction surfaces 5a,5b have been prepared by chip-removing processing in a manner known per se after casting of the base body 2 so that they have an average roughness depth Rz of 20 μm on their upper side.

A coating B consisting of an intermediate layer Z and a covering layer D is applied to the friction surfaces 5a,5b of the base body 2 processed in this way.

The intermediate layer Z has been produced from a commercially available stainless steel material provided in powder form, for example the above-mentioned stainless steel material standardized under the designation 316L. The thickness Dz of the intermediate layer Z was 120-140 μm.

For the application of the intermediate layer Z, the brake disk has been positioned in a horizontal position in a clamping device not shown here, which could be driven in a rotating manner about the rotational axis X-X of the brake disk 1 by means of a rotary drive also not shown here. Subsequently, the intermediate layer Z has been produced by means of laser deposition welding. For this purpose, a laser beam device not shown here (laser head diameter=5 mm) has been positioned in a starting position at the inner diameter of the friction ring 4 and the brake disk 1 has been rotated at 60 revolutions per minute. Starting from the starting position, the laser has then been moved radially in the direction of the outer circumference of the friction ring at a speed of 10 m/min. The laser has been ignited upon start-up and switched off upon reaching the outer diameter. With the start of the laser irradiation, the powdery steel material of the intermediate layer Z has been added to the region in each case swept by the laser beam in accordance with the procedure described in DE 10 2011 100 456 B4.

By the intermediate layer Z, unevenness present on the friction surfaces 5a,5b has been evened out and pores 6 have been closed so that, after application of the intermediate layer Z, a flat surface optimally suited for the application of a covering layer D was present on its side facing away from the base body 2.

In three tests, a covering layer D has been applied to three brake disks 1, each covered with the intermediate layer Z in the manner described above, as follows:

Hard material particles HP have been provided, which were tungsten carbide particles.

The hard material particles HP had an average grain diameter of −25-60 μm.

To the brake disk 1 clamped in a rotationally drivable manner as for the application of the intermediate layer Z, a layer of powder has been applied, that consisted of a stainless steel standardized under the material number 1.4404 according to the steel-iron list.

A laser beam has been directed at the powder, which laser beam has impinged on the section of the powder layer located in each case below it in a spot with a diameter of 2.9 mm in tests 1 and 2 and in a spot with a diameter of 1.2 mm in test 3.

Thereby, in test 1, the laser intensity was 0.2 KW/mm$^2$, in test 2, the laser had an intensity of 2.20 KW/mm$^2$ and in test 3 not being in accordance with the invention, a laser intensity of 3.50 KW/mm$^2$.

By rotating the brake disk 1 about the rotational axis X-X, the powder layer has been moved under the laser beam and, associated therewith, the laser spot has been moved successively over the powder layer until, after a corresponding number of revolutions, the stainless steel powder has melted completely and solidified again under formation of the stainless steel matrix E of the covering layer D.

Into the melt bath formed in each case from the stainless steel powder in the spot of the laser beam, a quantity of the provided hard material particles HP has been introduced, which was dimensioned such that in the melt bath there was a steel melt which consisted of 40% of the hard material particles HP and as remainder of the stainless steel melt.

The covering layer D produced in this way had a thickness Dd of 250 μm with a surface hardness of 950-1500 HV10.

Figure 2:
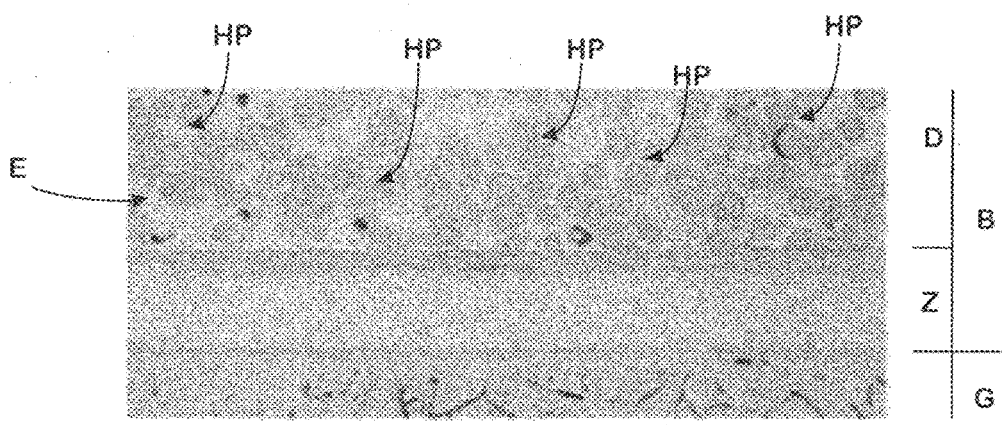
FIGS. 2-4 show microsections of a coating produced on the brake disk which microsections are aligned transversely to the circumferential direction of the brake disk.

At the brake disks 1 coated in this way, microsections aligned transversely to the circumferential direction have been produced, which are shown in FIGS. 2 (test 1), 3 (test 2) and 4 (test 3).

Figure 3:
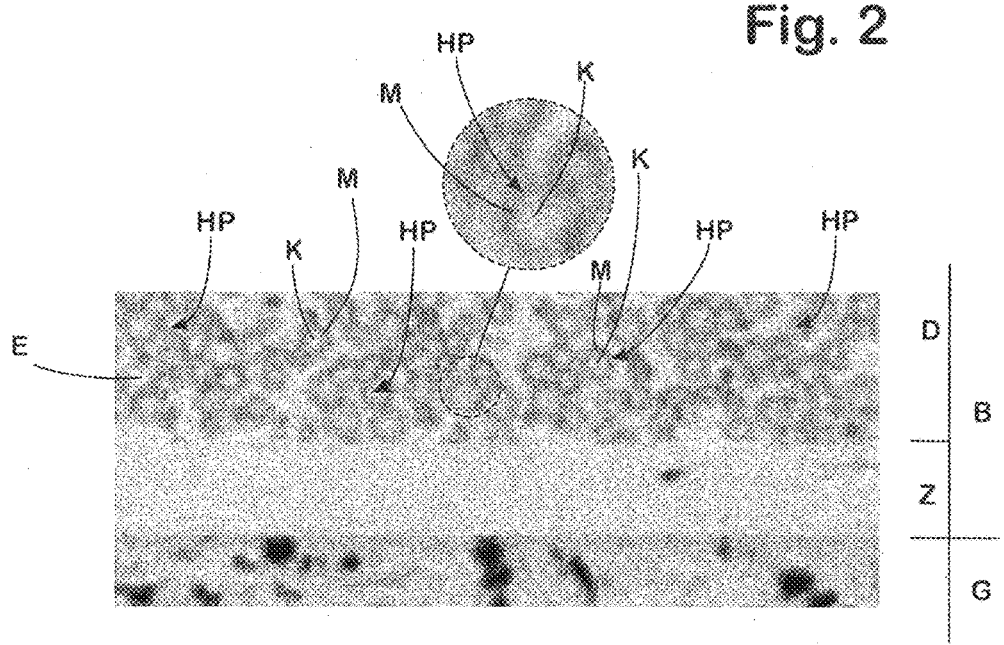
Figure 4:
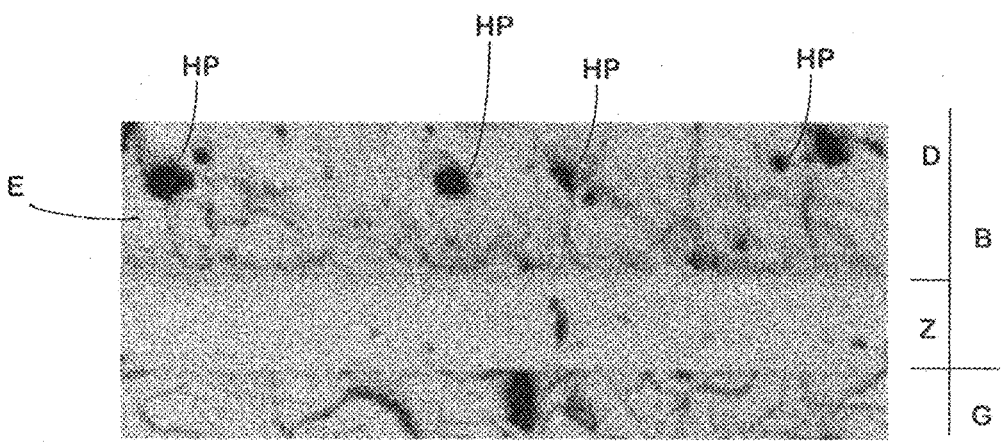

FIGS. 2-4 show the cast iron material G of the brake disk 1, the intermediate layer Z lying on the cast iron material G and the covering layer D lying on the intermediate layer Z with the hard material particles HP embedded therein.

The hard material particles HP each have a clearly visible inner core region K, which is not melted and is accordingly in the state in which the hard material particles HP have been introduced into the melt bath produced by the laser beam from the stainless steel powder during the production of the covering layer D.

The core region K of the hard material particles HP is in each case surrounded by a mixing zone M, in which material of the hard material particle HP is mixed with the stainless steel material of the stainless steel matrix E of the covering layer D. Via the mixing zone M, the hard material particles HP with their core region K are materially bonded to the stainless steel matrix E.

It can be seen that in the tests carried out according to the invention, i.e. with a laser intensity for which 0.1 laser intensity 2.5, the core regions K of the hard material particles HP in the stainless steel matrix E were present in a clearly defined shape.

In contrast, in test 3 not being in accordance with the invention due to the excessively high laser intensity, the hard material particles HP are melted and strongly deformed, so that they did not correspond to the original state in which they have been provided, either in terms of their shape or their properties. Rather, the regions visible as dark dots in FIG. 4 as a whole consist only of mixing zones in which the completely melted material of the hard phases is mixed with the stainless steel material of the stainless steel matrix E.

REFERENCE SIGNS

1 Brake disk
2 Base body of the brake disk 1
3 Support part of the brake disk 1
4 Friction ring of the brake disk 1
5a,5b Friction surface of the friction ring 4
6 Pores
B Coating
D Covering layer of the coating B
Dd Thickness of the covering layer D
Dz Thickness of the intermediate layer Z
E Stainless steel matrix of the covering layer D
G Iron casting material of the brake disk 1
HP Hard material particles
K Core region of the hard material particles
X Rotational axis of the brake disk 1
Z Intermediate layer of the coating B
M Mixing layer surrounding the hard material particles HP

The invention claimed is:

1. A component of a brake for a vehicle comprising:
   a metallic base body which has a surface which is provided with a coating, the coating comprising:
     an intermediate layer lying on the base body; and
     a covering layer lying on the intermediate layer,
   wherein the covering layer is formed from a stainless steel matrix with hard material particles embedded therein,
   the hard material particles embedded in the stainless steel matrix of the covering layer have an average grain diameter of 10 μm to 125 μm,
   each of the hard material particles has a non-melted core region surrounded at least in sections by a mixing zone having a composition formed from mixing of material of the stainless steel matrix and material of the respective hard material particle, and
   each of the hard material particles is materially bonded to the stainless steel matrix by the mixing zone.

2. The component according to claim 1, wherein the stainless steel matrix of the covering layer consists of a stainless steel with the material number 1.4404 or one of the stainless steels which are standardized in the US American standards AISI/ASTM under the numbers 316-431L.

3. The component according to claim 1, wherein, a surface hardness of the covering layer is 850-1050 HV10.

4. The component according to claim 3, wherein a difference between a smallest value Hmin of the surface hardness determined at a free surface of the covering layer and a largest value Hmax of the surface hardness determined at the free surface of the covering layer is at most 100 HV10.

5. A method for manufacturing a component for a brake for a vehicle, comprising:
   producing an intermediate layer on a surface of a base body of the component; and
   producing, by a method of laser deposition welding, in which a laser beam is moved over a stainless steel powder applied to a free surface of the intermediate layer, a covering layer on the intermediate layer, wherein the covering layer comprises a stainless steel matrix with hard material particles embedded therein,
   wherein during production of the covering layer, the laser beam is directed at the stainless steel powder applied to the intermediate layer with a laser intensity of 0.1-2.5 KW/mm$^2$,
   a spot, in which the laser beam impinges on the applied stainless steel powder and in which the stainless steel powder is melted to form a melt bath, has a diameter of 2.5-15 mm, and
   hard material particles with an average grain diameter of 15 μm to 135 μm are added into the melt bath thus formed.

6. The method according to claim 5, wherein the hard material particles embedded in the stainless steel matrix of the covering layer have an average grain diameter of at most 105 μm.

7. The method according to claim 6, wherein the hard material particles embedded in the stainless steel matrix of the covering layer have an average grain diameter of at most 60 μm.

8. The method according to claim 5, wherein the hard material particles embedded in the stainless steel matrix of the covering layer have an average grain diameter of at least 20 μm.

9. The method according to claim 8, wherein the hard material particles embedded in the stainless steel matrix of the covering layer have an average grain diameter of at least 45 μm.

10. The method according to claim 5, wherein the laser intensity of the laser beam used for producing of the covering layer is at most 1.2 KW/mm².

11. The method according to claim 5, wherein a laser power of the laser beam used for producing of the covering layer is 6-25 KW.

12. The method according to claim 5, wherein the component is preheated to a preheating temperature of 100-700° C. prior to impingement of the laser beam.

13. The method according to claim 12, wherein the component as a whole is preheated to the preheating temperature prior to application of the stainless steel powder.

14. The method according to claim 12, wherein the component is preheated to the preheating temperature in a locally restricted manner in a section in which the stainless steel powder is subsequently melted by the laser beam.

15. The method according to claim 14, wherein the component is preheated in a manner leading the laser beam.

16. The method according to claim 12, wherein the preheating is carried out by means of inductive heating.

* * * * *